(12) United States Patent
Xiao (10) Patent No.: US 8,897,121 B2
(45) Date of Patent: Nov. 25, 2014

(54) FREQUENCY OFFSET COMPENSATION AND EQUALIZATION METHOD AND DEVICE IN AN ORTHOGONAL FREQUENCY DIVISION MULTIPLEXING SYSTEM

(75) Inventor: Shaoning Xiao, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 191 days.

(21) Appl. No.: 13/576,814

(22) PCT Filed: Jan. 27, 2011

(86) PCT No.: PCT/CN2011/070713
§ 371 (c)(1),
(2), (4) Date: Aug. 2, 2012

(87) PCT Pub. No.: WO2011/147205
PCT Pub. Date: Dec. 1, 2011

(65) Prior Publication Data
US 2012/0300610 A1 Nov. 29, 2012

(30) Foreign Application Priority Data

May 24, 2010 (CN) .......................... 2010 1 0183629

(51) Int. Cl.
*H04K 1/10* (2006.01)
*H04L 12/26* (2006.01)
*H04J 1/16* (2006.01)
*G08C 15/00* (2006.01)
*G06F 11/00* (2006.01)

(52) U.S. Cl.
USPC ............ 370/203; 370/252; 375/260; 375/346

(58) Field of Classification Search
USPC .......... 370/208–210, 252–340; 375/260–316, 375/346–350
See application file for complete search history.

(56) References Cited

U.S. PATENT DOCUMENTS

| | | | |
|---|---|---|---|
| 6,882,694 B2 * | 4/2005 | Olivier | 375/346 |
| 7,139,321 B2 * | 11/2006 | Giannakis et al. | 375/260 |
| 7,149,266 B1 * | 12/2006 | Imamura et al. | 375/355 |
| 7,590,188 B2 * | 9/2009 | Giannakis et al. | 375/295 |

(Continued)

FOREIGN PATENT DOCUMENTS

| CN | 1514557 | 7/2004 |
|---|---|---|
| CN | 101547175 | 9/2009 |

OTHER PUBLICATIONS

International Search Report for PCT/CN2011/070713, English translation attached to original, Both completed by the Chinese Patent Office on Apr. 21, 2011, All together 6 Pages.

*Primary Examiner* — M. Phan
(74) *Attorney, Agent, or Firm* — Brooks Kushman P.C.

(57) ABSTRACT

A method is disclosed for frequency offset compensation and equalization in an orthogonal frequency division multiplexing system. The method comprises: acquiring a channel estimation value h and a frequency offset value f at a reference symbol; acquiring a Toeplitz matrix M(f) based on the frequency offset value f; performing phase compensation on the channel estimation value h to obtain a channel estimation value h' at a data symbol; and acquiring an estimation value of a transmitted symbol x based on M(f) and h'. A device is also disclosed for frequency offset compensation and equalization in the orthogonal frequency division multiplexing system. The device comprises a channel estimation unit, a frequency offset acquisition unit, a channel compensation unit and an equalization estimation unit.

13 Claims, 1 Drawing Sheet

(56) References Cited

U.S. PATENT DOCUMENTS

| | | | |
|---|---|---|---|
| 7,706,454 B2* | 4/2010 | Giannakis et al. | 375/260 |
| 7,844,018 B2* | 11/2010 | Tian et al. | 375/346 |
| 7,907,683 B2* | 3/2011 | Merched et al. | 375/316 |
| 8,064,528 B2* | 11/2011 | Giannakis et al. | 375/260 |
| 8,406,325 B2* | 3/2013 | Tsao et al. | 375/260 |
| 2007/0133700 A1* | 6/2007 | Kim et al. | 375/260 |
| 2008/0008261 A1* | 1/2008 | Baggen et al. | 375/296 |
| 2009/0232257 A1* | 9/2009 | Bury | 375/341 |
| 2009/0323871 A1 | 12/2009 | Merched et al. | |

* cited by examiner

FREQUENCY OFFSET COMPENSATION AND EQUALIZATION METHOD AND DEVICE IN AN ORTHOGONAL FREQUENCY DIVISION MULTIPLEXING SYSTEM

CROSS-REFERENCE TO RELATED APPLICATION

This application is the U.S. national phase of PCT Appln. No. PCT/CN2011/070713 filed Jan. 27, 2011 which claims priority to Chinese Application No. 201010183629.6 filed May 24, 2010, the disclosures of which are incorporated in their entirety by reference herein.

TECHNICAL FIELD

The present invention relates to the mobile communication system, and more specifically, to a method and device for frequency offset compensation and equalization in an Orthogonal Frequency Division Multiplexing (OFDM) communication system.

BACKGROUND OF THE RELATED ART

When crystal oscillators of a transmitter and receiver in a communication system are not aligned, received signals will be influenced by frequency offset. When a mobile terminal in the wireless communication system is in fast movement, Doppler Effect will also cause the frequency offset. When the frequency offset is comparatively large, performance of the receiver will be degraded. The frequency offset is required to be compensated in the receiver in order to eliminate influence of the frequency offset.

Currently, a typical method for frequency offset compensation in an OFDM communication system is to compensate for a phase difference of channel estimation corresponding to each different single carrier data symbol after the channel estimation is completed, and then perform equalization and multi-antenna combination. However, when the frequency offset is comparatively large, for example, in a scenario of high speed train, the method can not restrain large interference between sub-carriers caused by the frequency offset, resulting in poor reception performance.

SUMMARY OF THE INVENTION

A technical problem to be solved by the present invention is to provide a method and device for frequency offset compensation and equalization so as to restrain interference between sub-carriers in the case of large frequency offset and improve reception performance.

In order to solve the above problem, the present invention provides a method for frequency offset compensation and equalization in an orthogonal frequency division multiplexing system comprising:

acquiring a channel estimation value h and a frequency offset value f at a reference symbol;

acquiring a Toeplitz matrix M(f) based on the frequency offset value f;

performing phase compensation on the channel estimation value h to obtain a channel estimation value h' at a data symbol; and acquiring an estimation value of a transmitted symbol x based on M(f) and h', where $M(f)=(a_{k,l})$, $$a_{k,l} = \begin{cases} \left\{\dfrac{\sin(\pi\gamma)}{N\sin\left(\frac{\pi\gamma}{N}\right)}\right\}\exp\left(j\pi\gamma\dfrac{N-1}{N}\right), & \text{when } k = l \\ \left\{\dfrac{\sin(\pi\gamma)}{N\sin\left(\frac{\pi(l-k+\gamma)}{N}\right)}\right\}\exp\left(-j\pi\dfrac{l-k}{N}\right)\exp\left(j\pi\gamma\dfrac{N-1}{N}\right), & \text{when } k \neq l \end{cases}$$

or when $|k-l|>C$, $a_{k,l}=0$, C is a predetermined constant, and when $|k-l|\leq C$, $$a_{k,l} = \begin{cases} \left\{\dfrac{\sin(\pi\gamma)}{N\sin\left(\frac{\pi\gamma}{N}\right)}\right\}\exp\left(j\pi\gamma\dfrac{N-1}{N}\right), & \text{when } k = l \\ \left\{\dfrac{\sin(\pi\gamma)}{N\sin\left(\frac{\pi(l-k+\gamma)}{N}\right)}\right\}\exp\left(-j\pi\dfrac{l-k}{N}\right)\exp\left(j\pi\gamma\dfrac{N-1}{N}\right), & \text{when } k \neq l \end{cases}$$

k and l are sub-carrier identifiers, a value range of which is 0 to m−1, m is the number of sub-carriers used by frequency offset estimation, $$\gamma = \frac{f}{F},$$

F is an interval between the sub-carriers, N is the number of Fast Fourier Transform (FFT) points of one Orthogonal Frequency Division Multiplexing (OFDM) symbol.

Preferably, in the method, h'=h·exp(j2πfΔt), and Δt is a directed time difference between the data symbol and reference symbol.

Preferably, in the method, in the case of a single user and a single antenna, the step of acquiring the estimation value of the transmitted symbol x based on M(f) and h' comprises:

acquiring the estimation value of the transmitted symbol x based on M(f)diag(h')x+n=y as follows:

$\hat{x}=(\sigma^2\beta I+A^HA)^{-1}*A^Hy;$ or $\hat{x}=(A^HA)^{-1}*A^Hy;$ or $\hat{x}=(\sigma^2\beta I+B^HB)^{-1}*B^H*M(-f)*y;$ or $\hat{x}=(B^HB)^{-1}*B^H*M(-f)*y;$ where diag(h') is a diagonal matrix, a diagonal element of which is the channel estimation value h', y is a received data symbol, n is noise, A=M(f)diag(h'), $A^H$ represents a conjugate transpose of matrix A, $\sigma^2$ is noise power spectral density, β is a constant associated with digital modulation, and I is an identity matrix, B=diag(h'), and $B^H$ represents a conjugate transpose of matrix B.

Preferably, in the case of a single user and multiple antennas, the step of acquiring the estimation value of the transmitted symbol x based on M(f) and h' comprises:

acquiring the estimation value of the transmitted symbol x based on $$\begin{bmatrix} M(f)\text{diag}(h'_1) \\ M(f)\text{diag}(h'_2) \\ \vdots \\ M(F)\text{diag}(h'_N) \end{bmatrix} x + W = \begin{bmatrix} y_1 \\ y_2 \\ \vdots \\ y_N \end{bmatrix}$$

as follows:

$$\hat{x} = (\sigma^2 \beta I + A^H A)^{-1} * A^H y; \text{ or}$$

$$\hat{x} = (A^H A)^{-1} * A^H y; \text{ or}$$

$$\hat{x} = (\sigma^2 \beta I + B^H B)^{-1} * B^H * M(-f) * y; \text{ or}$$

$$\hat{x} = (B^H B)^{-1} * B^H * M(-f) * y; \text{ where}$$

$$y = \begin{bmatrix} y_1 \\ y_2 \\ \vdots \\ y_N \end{bmatrix}, A = \begin{bmatrix} M(f)\text{diag}(h'_1) \\ M(f)\text{diag}(h'_2) \\ \vdots \\ M(f)\text{diag}(h'_N) \end{bmatrix}, B = \begin{bmatrix} \text{diag}(h'_1) \\ \text{diag}(h'_2) \\ \vdots \\ \text{diag}(h'_N) \end{bmatrix}, y_i$$

is a received data symbol on the $i^{th}$ antenna, $h_i'$ is a channel estimation value corresponding to the received data symbol on the $i^{th}$ antenna, $\text{diag}(h_i')$ is a diagonal matrix, a diagonal elements of which is the channel estimation value $h_i'$, $1 \le i \le N$, N is the number of antennas, W is noise, $\sigma^2$ is noise power spectral density, $\beta$ is a constant associated with digital modulation, I is an identity matrix, $A^H$ represents a conjugate transpose of matrix A, and $B^H$ represents a conjugate transpose of matrix B.

Preferably, in the case of multiple users and multiple antennas, the step of acquiring the estimation value of the transmitted symbol x based on $M(f)$ and $h'$ comprises:

acquiring the estimation value of the transmitted symbol x based on $$\begin{cases} y_1 = M(f_1)\text{diag}(h'_{1,1})x_1 + M(f_2)\text{diag}(h'_{1,2})x_2 + \ldots + \\ \qquad M(f_M)\text{diag}(h'_{1,M})x_M + n_1 \\ y_2 = M(f_1)\text{diag}(h'_{2,1})x_1 + M(f_2)\text{diag}(h'_{2,2})x_2 + \ldots + \\ \qquad M(f_M)\text{diag}(h'_{2,M})x_M + n_2 \\ \vdots \\ y_N = M(f_1)\text{diag}(h'_{N,1})x_1 + M(f_2)\text{diag}(h'_{N,2})x_2 + \ldots + \\ \qquad M(f_M)\text{diag}(h'_{N,M})x_M + n_N \end{cases}$$

as follows:

$$\hat{x} = (\sigma^2 \beta I + A^H A)^{-1} * A^H y; \text{ or}$$

$$\hat{x} = (A^H A)^{-1} * A^H y; \text{ or}$$

$$\hat{x} = (\sigma^2 \beta I + B^H B)^{-1} * B^H * M(-f) * y; \text{ or}$$

$$\hat{x} = (B^H B)^{-1} * B^H * M(-f) * y; \text{ where}$$

$$y = \begin{bmatrix} y_1 \\ y_1 \\ \vdots \\ y_N \end{bmatrix},$$

-continued $$A = \begin{bmatrix} M(f_1)\text{diag}(h'_{1,1}) & M(f_2)\text{diag}(h'_{1,2}) & \ldots & M(f_M)\text{diag}(h'_{1,M}) \\ M(f_1)\text{diag}(h'_{2,1}) & M(f_2)\text{diag}(h'_{2,2}) & \ldots & M(f_M)\text{diag}(h'_{2,M}) \\ \vdots & \vdots & \vdots & \vdots \\ M(f_1)\text{diag}(h'_{N1}) & M(f_2)\text{diag}(h'_{N,2}) & \ldots & M(f_M)\text{diag}(h'_{N,M}) \end{bmatrix}$$

$$M(f) = \begin{bmatrix} M(f_1) \\ M(f_2) \\ \vdots \\ M(f_M) \end{bmatrix},$$

$$B = \begin{bmatrix} \text{diag}(h'_{1,1}) & \text{diag}(h'_{1,2}) & \ldots & \text{diag}(h'_{1,M}) \\ \text{diag}(h'_{2,1}) & \text{diag}(h'_{2,2}) & \ldots & \text{diag}(h'_{2,M}) \\ \vdots & \vdots & \vdots & \vdots \\ \text{diag}(h'_{N1}) & \text{diag}(h'_{N,2}) & \ldots & \text{diag}(h'_{N,M}) \end{bmatrix},$$

$y_i$ is a received data symbol on the $i^{th}$ antenna, $h_{i,j}'$ is a channel estimation value corresponding to the received data symbol on the $i^{th}$ antenna, $\text{diag}(h_{i,j}')$ is a diagonal matrix, a diagonal element of which is the channel estimation value $h_{i,j}'$, $n_i$ is noise, M is the number of users, N is the number of antennas, M<N, $1 \le i \le N$, $\sigma^2$ is noise power spectral density, $\beta$ is a constant associated with digital modulation, I is an identity matrix, $A^H$ represents a conjugate transpose of matrix A, and $B^H$ represents a conjugate transpose of matrix B.

The present invention further provides a device for frequency offset compensation and equalization in an orthogonal frequency division multiplexing system comprising:

a channel estimation unit configured to acquire a channel estimation value h and a frequency offset value f at a reference symbol;

a frequency offset acquisition unit configured to acquire a Toeplitz matrix $M(f)$ based on the frequency offset value f;

a channel compensation unit configured to perform phase compensation on the channel estimation value h to obtain a channel estimation value h' at a data symbol; and an equalization estimation unit configured to acquire an estimation value of a transmitted symbol x based on $M(f)$ and h', where $M(f)=(a_{k,l})$, $$a_{k,l} = \begin{cases} \left\{ \dfrac{\sin(\pi\gamma)}{N\sin\left(\dfrac{\pi\gamma}{N}\right)} \right\} \exp\left(j\pi\gamma \dfrac{N-1}{N}\right), \text{ when } k = l \\ \left\{ \dfrac{\sin(\pi\gamma)}{N\sin\left(\dfrac{\pi(l-k+\gamma)}{N}\right)} \right\} \exp\left(-j\pi\dfrac{l-k}{N}\right)\exp\left(j\pi\gamma\dfrac{N-1}{N}\right), \text{ when } k \ne l \end{cases}$$

or
when $|k-l|>C$, $a_{k,l}=0$, C is a predetermined constant, and when $|k-k| \le C$, $$a_{k,l} = \begin{cases} \left\{ \dfrac{\sin(\pi\gamma)}{N\sin\left(\dfrac{\pi\gamma}{N}\right)} \right\} \exp\left(j\pi\gamma \dfrac{N-1}{N}\right), \text{ when } k = l \\ \left\{ \dfrac{\sin(\pi\gamma)}{N\sin\left(\dfrac{\pi(l-k+\gamma)}{N}\right)} \right\} \exp\left(-j\pi\dfrac{l-k}{N}\right)\exp\left(j\pi\gamma\dfrac{N-1}{N}\right), \text{ when } k \ne l \end{cases}$$

k and l are sub-carrier identifiers, a value range of which is 0 to m−1, m is the number of sub-carriers used by frequency offset estimation, $$\gamma = \frac{f}{F},$$

F is an interval between the sub-carriers, N is the number of Fast Fourier Transform (FFT) points of one Orthogonal Frequency Division Multiplexing (OFDM) symbol.

Preferably, in the device, h'=h−exp(j2πfΔt), and Δt is a directed time difference between the data symbol and reference symbol.

Preferably, in the device, the equalization estimation unit is further configured to, in the case of a single user and a single antenna, acquire the estimation value of the transmitted symbol x based on M(f)diag(h')x+n=y as follows:

$$\hat{x} = (\sigma^2\beta I + A^H A)^{-1} * A^H y;$$

or $\hat{x} = (A^H A)^{-1} * A^H y;$ or $\hat{x} = (\sigma^2\beta I + B^H B)^{-1} * B^H * M(-f)^* y;$ or $\hat{x} = (B^H B)^{-1} * B^H * M(-f)^* y;$ where diag(h') is a diagonal matrix, a diagonal element of which is the channel estimation value h', y is a received data symbol, n is noise, A=M(f)diag(h'), $A^H$ represents a conjugate transpose of matrix A, $\sigma^2$ is noise power spectral density, β is a constant associated with digital modulation, I is an identity matrix, B=diag(h'), and $B^H$ represents a conjugate transpose of matrix B.

Preferably, in the device, the equalization estimation unit is further configured to, in the case of a single user and multiple antennas, acquire the estimation value of the transmitted symbol x based on $$\begin{bmatrix} M(f)\text{diag}(h'_1) \\ M(f)\text{diag}(h'_2) \\ \vdots \\ M(f)\text{diag}(h'_N) \end{bmatrix} x + W = \begin{bmatrix} y_1 \\ y_2 \\ \vdots \\ y_N \end{bmatrix}$$

as follows:

$$\hat{x} = (\sigma^2\beta I + A^H A)^{-1} * A^H y; \text{ or}$$

$$\hat{x} = (A^H A)^{-1} * A^H y; \text{ or}$$

$$\hat{x} = (\sigma^2\beta I + B^H B)^{-1} * B^H * M(-f) * y; \text{ or}$$

$$\hat{x} = (B^H B)^{-1} * B^H * M(-f) * y; \text{ where}$$

$$y = \begin{bmatrix} y_1 \\ y_2 \\ \vdots \\ y_N \end{bmatrix}, A = \begin{bmatrix} M(f)\text{diag}(h'_1) \\ M(f)\text{diag}(h'_2) \\ \vdots \\ M(f)\text{diag}(h'_N) \end{bmatrix}, B = \begin{bmatrix} \text{diag}(h'_1) \\ \text{diag}(h'_2) \\ \vdots \\ \text{diag}(h'_N) \end{bmatrix},$$

$y_i$ is a received data symbol on the $i^{th}$ antenna, $h_i'$ is a channel estimation value corresponding to the received data symbol on the $i^{th}$ antenna, diag($h_i'$) is a diagonal matrix, a diagonal elements of which is the channel estimation value $h_i'$, 1≤i≤N, N is the number of antennas, W is noise, $\sigma^2$ is noise power spectral density, β is a constant associated with digital modulation, I is an identity matrix, $A^H$ represents a conjugate transpose of matrix A, and $B^H$ represents a conjugate transpose of matrix B.

Preferably, in the device, the equalization estimation unit is further configured to, in the case of multiple users and multiple antennas, acquire the estimation value of the transmitted symbol x based on $$\begin{cases} y_1 = M(f_1)\text{diag}(h'_{1,1})x_1 + M(f_2)\text{diag}(h'_{1,2})x_2 + \\ \qquad \ldots + M(f_M)\text{diag}(h'_{1,M})x_M + n_1 \\ y_2 = M(f_1)\text{diag}(h'_{2,1})x_1 + M(f_2)\text{diag}(h'_{2,2})x_2 + \\ \qquad \ldots + M(f_M)\text{diag}(h'_{2,M})x_M + n_2 \\ \qquad \vdots \\ y_N = M(f_1)\text{diag}(h'_{N,1})x_1 + M(f_2)\text{diag}(h'_{N,2})x_2 + \\ \qquad \ldots + M(f_M)\text{diag}(h'_{N,M})x_M + n_N \end{cases}$$

as follows:

$$\hat{x} = (\sigma^2\beta I + A^H A)^{-1} * A^H y; \text{ or}$$

$$\hat{x} = (A^H A)^{-1} * A^H y; \text{ or}$$

$$\hat{x} = (\sigma^2\beta I + B^H B)^{-1} * B^H * M(-f) * y; \text{ or}$$

$$\hat{x} = (B^H B)^{-1} * B^H * M(-f) * y; \text{ where}$$

$$y = \begin{bmatrix} y_1 \\ y_1 \\ \vdots \\ y_N \end{bmatrix},$$

$$A = \begin{bmatrix} M(f_1)\text{diag}(h'_{1,1}) & M(f_2)\text{diag}(h'_{1,2}) & \ldots & M(f_M)\text{diag}(h'_{1,M}) \\ M(f_1)\text{diag}(h'_{2,1}) & M(f_2)\text{diag}(h'_{2,2}) & \ldots & M(f_M)\text{diag}(h'_{2,M}) \\ \vdots & \vdots & & \vdots \\ M(f_1)\text{diag}(h'_{N,1}) & M(f_2)\text{diag}(h'_{N,2}) & \ldots & M(f_M)\text{diag}(h'_{N,M}) \end{bmatrix},$$

$$M(f) = \begin{bmatrix} M(f_1) \\ M(f_2) \\ \vdots \\ M(f_M) \end{bmatrix},$$

$$B = \begin{bmatrix} \text{diag}(h'_{1,1}) & \text{diag}(h'_{1,2}) & \ldots & \text{diag}(h'_{1,M}) \\ \text{diag}(h'_{2,1}) & \text{diag}(h'_{2,2}) & \ldots & \text{diag}(h'_{2,M}) \\ \vdots & \vdots & & \vdots \\ \text{diag}(h'_{N,1}) & \text{diag}(h'_{N,2}) & \ldots & \text{diag}(h'_{N,M}) \end{bmatrix},$$

$y_i$ is a received data symbol on the $i^{th}$ antenna, $h_{i,j}'$ is a channel estimation value corresponding to the received data symbol on the $i^{th}$ antenna, diag($h_{i,j}'$) is a diagonal matrix, a diagonal element of which is the channel estimation value $h_{i,j}'$, $n_i$ is noise, M is the number of users, N is the number of antennas, M<N, 1≤i≤N, $\sigma^2$ is noise power spectral density, β is a constant associated with digital modulation, I is an identity matrix, $A^H$ represents a conjugate transpose of matrix A, and $B^H$ represents a conjugate transpose of matrix B.

The present invention allows a receiver in a communication system to compensate for frequency offset more accurately when signal frequency offset is relatively large so as to restrain interference between sub-carriers and improve performance of the receiver in the case of large frequency offset.

PREFERRED EMBODIMENTS OF THE PRESENT INVENTION

The present invention is a method for frequency offset compensation and equalization of data symbols in an orthogonal frequency division multiplexing communication system, and is accomplished in conjunction with frequency offset compensation and equalization, and multi-antenna combination.

Taking A 3GPP LTE uplink receiver as an example, the present invention will be described in detail below.

An OFDM demodulated 3GPP LTE uplink air interface signal may be represented as follows:

$$Y(k) = (X(k)H(k))\left\{\frac{\sin(\pi\gamma)}{N\sin\left(\frac{\pi\gamma}{N}\right)}\right\}\exp\left(j\pi\gamma\frac{N-1}{N}\right) + I(k) + W(k) \quad (1)$$

k is an identifier of a sub-carrier allocated to a certain mobile terminal, X(k) is a transmitted signal on the $k^{th}$ sub-carrier, Y(k) is a received signal on the $k^{th}$ sub-carrier, H(k) is a channel estimation value on the $k^{th}$ sub-carrier. γ is a normalized frequency offset value, when an interval between the sub-carriers is F, $$\gamma = \frac{f}{F},$$

and f is a frequency offset value, for example, when F=15000 Hz, $$\gamma = \frac{f}{15000}.$$

N is the number of Fast Fourier Transform (FFT) points of one OFDM symbol, i.e, the number of sampling points of one symbol in a LTE system, and when the system bandwidth is 20M, N is 2048.

I(k) is interference of other sub-carriers to the $k^{th}$ sub-carrier, W(k) is a noise item, where $$I(k) = \sum_{l=0,l\neq k}^{m-1}(X(l)H(l))\left\{\frac{\sin(\pi\gamma)}{N\sin\left(\frac{\pi(l-k+\gamma)}{N}\right)}\right\}\exp\left(j\pi\gamma\frac{N-1}{N}\right)\exp\left(-j\pi\frac{l-k}{N}\right) \quad (2)$$

where m is the number of sub-carriers used by frequency offset estimation.

Formula (1) may be represented in a form of a matrix:

$$y = M(f)\text{diag}(X)h + n \quad (3)$$

y=M(f)diag(P)h+n at a symbol of a reference signal, P is a reference signal transmitted by a mobile terminal, matrix diag(P) is a diagonal matrix, and a diagonal element of which is the reference signal. M(f) is a Toeplitz matrix, and each element of $M(f)=(a_{k,l})$ is defined as follows:

$$a_{k,l} = \quad (4)$$

$$\begin{cases} \left\{\frac{\sin(\pi\gamma)}{N\sin\left(\frac{\pi\gamma}{N}\right)}\right\}\exp\left(j\pi\gamma\frac{N-1}{N}\right), \text{ when } k = l \\ \left\{\frac{\sin(\pi\gamma)}{N\sin\left(\frac{\pi(l-k+\gamma)}{N}\right)}\right\}\exp\left(-j\pi\frac{l-k}{N}\right)\exp\left(j\pi\gamma\frac{N-1}{N}\right), \text{ when } k \neq l \end{cases}$$

In order to simplify calculation, and considering that the interference between the sub-carriers are mainly from adjacent sub-carriers, values can be taken in the following way: if |k−l|>C, $a_{k,l}$=0, where three typical values of the constant C are 1, 2 and 3 respectively, and values in other cases are taken in a same way as that in formula (4).

Figure 1:
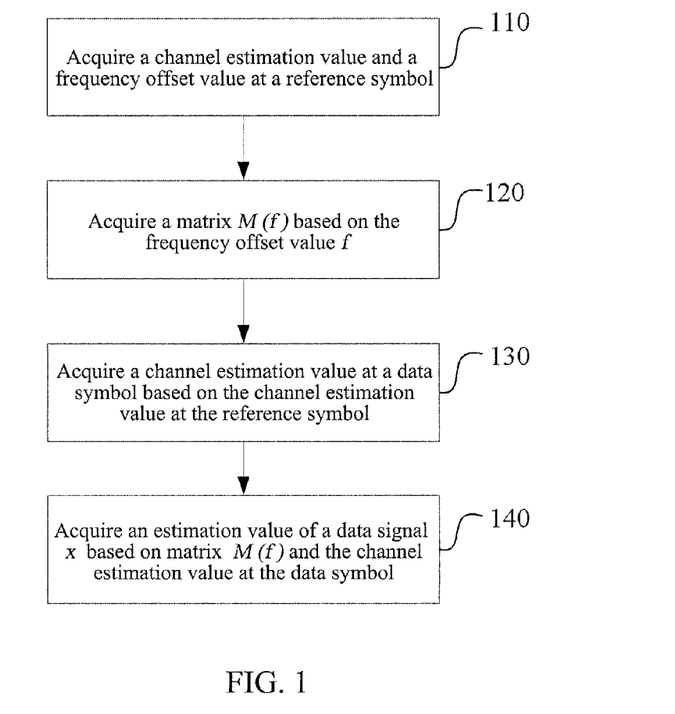
FIG. 1 is a flow diagram of a method for frequency offset compensation and equalization according to the present invention.

The method for frequency offset compensation and equalization in accordance with the present invention comprises the following steps.

In step 110, a channel estimation value h and a frequency offset value f at a reference symbol are acquired.

In step 120, a Toeplitz matrix M(f) is acquired based on the frequency offset value f; where the definition of M(f) and its simplified value-taking mode are described with reference to formula (4).

In step 130, phase compensation is performed on the channel estimation value h to obtain a channel estimation value h' at each data symbol.

The channel estimation value h' at each data symbol is obtained based on formula h'=h·exp(j2πfΔt), Δt is a directed time difference between the data symbol and reference symbol, Δt is less than 0 when the reference symbol is preceded by the data symbol, and Δt is greater than 0 when the data symbol is subsequent to the reference symbol.

In step 140, an estimation value of a transmitted symbol x is acquired based on M(f) and h'.

Approaches for acquiring the estimation value of x will be described below.

1) In the case of a single user and a single antenna, for data symbols, there is the following equation:

$$M(f)\text{diag}(h')x + n = y \quad (5)$$

where y is a received data symbol, and n is noise.

Let A=M(f)diag(h'), the estimation value of x is obtained:

$$\hat{x} = (\sigma^2\beta I + A^H A)^{-1} * A^H y \quad (6)$$

$$\text{or } \hat{x} = (A^H A)^{-1} * A^H y \quad (7)$$

where $A^H$ represents a conjugate transpose of matrix A, $\sigma^2$ is noise power spectral density, β is a constant associated with digital modulation. I is an identity matrix. In the case of QPSK modulation, β=1.

Furthermore, the formula may be simplified based on $M(f)^{-1} \approx M(-f)$ to obtain the estimation value of x:

$$\hat{x} = (\sigma^2\beta I + B^H B)^{-1} * B^H * M(-f) * y \quad (8)$$

$$\text{or } \hat{x} = (B^H B)^{-1} * B^H * M(-f) * y \quad (9)$$

where B=diag(h'), $B^H$ represents a conjugate transpose of matrix B, $\sigma^2$ is noise power spectral density, $\beta$ is a constant associated with digital modulation, and I is an identity matrix. $M(f)^{-1}$ is an inverse matrix of M(f).

2) In the case of a single user and multiple antenna, for data symbols, there is the following equation:

$$\begin{bmatrix} M(f)\text{diag}(h'_1) \\ M(f)\text{diag}(h'_2) \\ \vdots \\ M(f)\text{diag}(h'_N) \end{bmatrix} x + W = \begin{bmatrix} y_1 \\ y_2 \\ \vdots \\ y_N \end{bmatrix} \quad (10)$$

where $y_i$ is a received data symbol on the $i^{th}$ antenna, $h_i'$ is a channel estimation value corresponding to the received data symbol on the $i^{th}$ antenna, and W is noise.

$$\text{Let } \begin{bmatrix} y_1 \\ y_2 \\ \vdots \\ y_N \end{bmatrix} = y \text{ and } A = \begin{bmatrix} M(f)\text{diag}(h'_1) \\ M(f)\text{diag}(h'_2) \\ \vdots \\ M(f)\text{diag}(h'_N) \end{bmatrix},$$

the minimum mean-square error estimation value of x is:

$$\hat{x} = (\sigma^2 \beta I + A^H A)^{-1} * A^H y \quad (11)$$

or zero-forcing estimation can be used: $\hat{x} = (A^H A)^{-1} * A^H y$ (12)

where $A^H$ represents a conjugate transpose of matrix A, $\sigma^2$ is noise power spectral density, $\beta$ is a constant associated with digital modulation. I is an identity matrix. In the case of QPSK modulation, $\beta=1$.

Furthermore, the formula may be simplified based on $M(f)^{-1} \approx M(-f)$ to obtain $$\begin{bmatrix} \text{diag}(h'_1) \\ \text{diag}(h'_2) \\ \vdots \\ \text{diag}(h'_N) \end{bmatrix} x + W' = M(-f) \begin{bmatrix} y_1 \\ y_2 \\ \vdots \\ y_N \end{bmatrix} \quad (13)$$

$$\text{Let } B = \begin{bmatrix} \text{diag}(h'_1) \\ \text{diag}(h'_2) \\ \vdots \\ \text{diag}(h'_N) \end{bmatrix},$$

the minimum mean-square error estimation value of x is obtained:

$$\hat{x} = (\sigma^2 \beta I + B^H B)^{-1} * B^H * M(-f) * y \quad (14),$$

or a zero-forcing estimation value of x can be used:

(15) $\hat{x} = (B^H B)^{-1} * B^H * M(-f) * y$

3) In the case of multiple users and multiple antennas, for data symbols, there is the following system equation:

$$\begin{cases} y_1 = M(f_1)\text{diag}(h'_{1,1})x_1 + M(f_2)\text{diag}(h'_{1,2})x_2 + \\ \quad \ldots + M(f_M)\text{diag}(h'_{1,M})x_M + n_1 \\ y_2 = M(f_1)\text{diag}(h'_{2,1})x_1 + M(f_2)\text{diag}(h'_{2,2})x_2 + \\ \quad \ldots + M(f_M)\text{diag}(h'_{2,M})x_M + n_2 \\ \quad \vdots \\ y_N = M(f_1)\text{diag}(h'_{N,1})x_1 + M(f_2)\text{diag}(h'_{N,2})x_2 + \\ \quad \ldots + M(f_M)\text{diag}(h'_{N,M})x_M + n_N \end{cases} \quad (16)$$

where $y_1$ is a data symbol received by the $1^{st}$ antenna, $y_2$ is a data symbol received by the $2^{nd}$ antenna, and $y_N$ is a data symbol received by the $N^{th}$ antenna (typical values of N are 2, 4 and 8);

$x_1$ is a data symbol transmitted by the $1^{st}$ user, $x_2$ is a data symbol transmitted by the $2^{nd}$ user, and $x_M$ is a data symbol transmitted by the $M^{th}$ user;

$f_1$ is frequency offset of the $1^{st}$ user, $f_2$ is frequency offset of the $2^{nd}$ user, and $f_M$ is frequency offset of the $M^{th}$ user;

$h_{1,1}'$ is channel estimation corresponding to the data symbol transmitted by the $1^{st}$ user received by the $1^{st}$ antenna, $h_{1,2}'$ is channel estimation corresponding to the data symbol transmitted by the $2^{nd}$ user received by the $1^{st}$ antenna, and $h_{N,M}'$ is channel estimation corresponding to the data symbol transmitted by the $M^{th}$ user received by the $N^{th}$ antenna, where M<N;

$n_i (1 \leq i \leq N)$ is a noise item.

$$\text{Let } y = \begin{bmatrix} y_1 \\ y_1 \\ \vdots \\ y_N \end{bmatrix}, x = \begin{bmatrix} x_1 \\ x_1 \\ \vdots \\ x_M \end{bmatrix} \text{ and }$$

$$A = \begin{bmatrix} M(f_1)\text{diag}(h'_{1,1}) & M(f_2)\text{diag}(h'_{1,2}) & \ldots & M(f_M)\text{diag}(h'_{1,M}) \\ M(f_1)\text{diag}(h'_{2,1}) & M(f_2)\text{diag}(h'_{2,2}) & \ldots & M(f_M)\text{diag}(h'_{2,M}) \\ \vdots & \vdots & & \vdots \\ M(f_1)\text{diag}(h'_{N,1}) & M(f_2)\text{diag}(h'_{N,2}) & \ldots & M(f_M)\text{diag}(h'_{N,M}) \end{bmatrix},$$

the minimum mean-square error estimation value of x is:

$$\hat{x} = (\sigma^2 \beta I + A^H A)^{-1} * A^H y \quad (17)$$

or the zero-forcing estimation can be used:

$$\hat{x} = (A^H A)^{-1} * A^H y \quad (18)$$

where $A^H$ represents a conjugate transpose of matrix A, $\sigma^2$ is noise power spectral density, $\beta$ is a constant associated with digital modulation. I is an identity matrix. In the case of QPSK modulation, $\beta=1$.

Furthermore, the formula may be simplified based on $M(f)^{-1} \approx M(-f)$ to obtain $$\begin{bmatrix} \text{diag}(h_{1,1}) & \text{diag}(h_{1,2}) & \ldots & \text{diag}(h_{1,M}) \\ \text{diag}(h_{2,1}) & \text{diag}(h_{2,2}) & \ldots & \text{diag}(h_{1,M}) \\ \vdots & \vdots & & \vdots \\ \text{diag}(h_{N,1}) & \text{diag}(h_{N,2}) & \ldots & \text{diag}(h_{N,M}) \end{bmatrix} x + W^1 = M(-f)y \quad (19)$$

where

-continued $$M(f) = \begin{bmatrix} M(f_1) \\ M(f_2) \\ \vdots \\ M(f_M) \end{bmatrix}.$$

Let $B = \begin{bmatrix} \text{diag}(h_{1,1}) & \text{diag}(h_{1,2}) & \ldots & \text{diag}(h_{1,M}) \\ \text{diag}(h_{2,1}) & \text{diag}(h_{2,2}) & \ldots & \text{diag}(h_{1,M}) \\ \vdots & \vdots & & \vdots \\ \text{diag}(h_{N,1}) & \text{diag}(h_{N,2}) & \ldots & \text{diag}(h_{N,M}) \end{bmatrix}$, the minimum mean-square error estimation value of x is obtained:

$$\hat{x} = (\sigma^2 \beta I + B^H B)^{-1} * B^H * M(-f) * y \quad (20)$$

or a zero-forcing estimation value of x can be used:

$$\hat{x} = (B^H B)^* B^H * M(-f) * y \quad (21)$$

Figure 2:
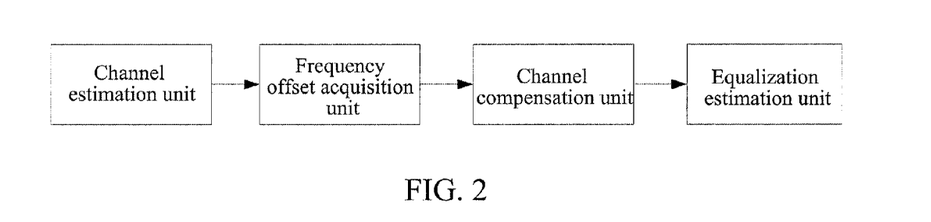
FIG. 2 is a block diagram of a device for frequency offset compensation and equalization according to the present invention.

The present invention also provides a device for frequency offset compensation and equalization in an orthogonal frequency division multiplexing system comprising:

a channel estimation unit configured to acquire a channel estimation value h and a frequency offset value f at a reference symbol;

a frequency offset acquisition unit configured to acquire a Toeplitz matrix M(f) based on the frequency offset value f;

a channel compensation unit configured to perform phase compensation on the channel estimation value h to obtain a channel estimation value h' at a data symbol; and an equalization estimation unit configured to acquire an estimation value of a transmitted symbol x based on M(f) and h', where $M(f) = (a_{k,l})$, $$a_{k,l} = \begin{cases} \left\{ \dfrac{\sin(\pi\gamma)}{N\sin\left(\dfrac{\pi\gamma}{N}\right)} \right\} \exp\left(j\pi\gamma\dfrac{N-1}{N}\right), \text{ when } k = l \\ \left\{ \dfrac{\sin(\pi\gamma)}{N\sin\left(\dfrac{\pi(l-k+\gamma)}{N}\right)} \right\} \exp\left(-j\pi\dfrac{l-k}{N}\right)\exp\left(j\pi\gamma\dfrac{N-1}{N}\right), \text{ when } k \neq l \end{cases}$$

or when $|k-l| > C$, $a_{k,l} = 0$, C is a predetermined constant, and when $|k-l| \leq C$, $$a_{k,l} = \begin{cases} \left\{ \dfrac{\sin(\pi\gamma)}{N\sin\left(\dfrac{\pi\gamma}{N}\right)} \right\} \exp\left(j\pi\gamma\dfrac{N-1}{N}\right), \text{ when } k = l \\ \left\{ \dfrac{\sin(\pi\gamma)}{N\sin\left(\dfrac{\pi(l-k+\gamma)}{N}\right)} \right\} \exp\left(-j\pi\dfrac{l-k}{N}\right)\exp\left(j\pi\gamma\dfrac{N-1}{N}\right), \text{ when } k \neq l \end{cases}$$

k and l are sub-carrier identifiers, a value range of which is 0 to m−1, m is the number of sub-carriers used by frequency offset estimation, $$\gamma = \dfrac{f}{F},$$

F is an interval between the sub-carriers, N is the number of Fast Fourier Transform (FFT) points of one Orthogonal Frequency Division Multiplexing (OFDM) symbol.

h'=h·exp(j2πfΔt), and Δt is a directed time difference between the data symbol and reference symbol.

The equalization estimation unit is further configured to, in the case of a single user and a single antenna, acquire the estimation value of the transmitted symbol x based on M(f) diag(h')x+n=y as follows:

$$\hat{x} = (\sigma^2 \beta I + A^H A)^{-1} * A^H y;$$

or $\hat{x} = (A^H A)^{-1} * A^H y;$ or $\hat{x} = (\sigma^2 \beta I + B^H B)^{-1} * B^H * M(-f) * y;$ or $\hat{x} = (B^H B)^{-1} * B^H * M(-f) * y;$ where diag(h') is a diagonal matrix, a diagonal element of which is the channel estimation value h', y is a received data symbol, n is noise, A=M(f)diag(h'), $A^H$ represents a conjugate transpose of matrix A, $\sigma^2$ is noise power spectral density, β is a constant associated with digital modulation, I is an identity matrix, B=diag(h'), and $B^H$ represents a conjugate transpose of matrix B.

The equalization estimation unit is further configured to, in the case of a single user and multiple antennas, acquire the estimation value of the transmitted symbol x based on $$\begin{bmatrix} M(f)\text{diag}(h'_1) \\ M(f)\text{diag}(h'_2) \\ \vdots \\ M(f)\text{diag}(h'_N) \end{bmatrix} x + W = \begin{bmatrix} y_1 \\ y_2 \\ \vdots \\ y_N \end{bmatrix}$$

as follows:

$\hat{x} = (\sigma^2 \beta I + A^H A)^{-1} * A^H y;$ or $\hat{x} = (A^H A)^{-1} * A^H y;$ or $\hat{x} = (\sigma^2 \beta I + B^H B)^{-1} * B^H * M(-f) * y;$ or $\hat{x} = (B^H B)^{-1} * B^H * M(-f) * y;$ where $$y = \begin{bmatrix} y_1 \\ y_2 \\ \vdots \\ y_N \end{bmatrix}, A = \begin{bmatrix} M(f)\text{diag}(h'_1) \\ M(f)\text{diag}(h'_2) \\ \vdots \\ M(f)\text{diag}(h'_N) \end{bmatrix}, B = \begin{bmatrix} \text{diag}(h'_1) \\ \text{diag}(h'_2) \\ \vdots \\ \text{diag}(h'_N) \end{bmatrix},$$

$y_i$ is a received data symbol on the $i^{th}$ antenna, $h_i'$ is a channel estimation value corresponding to the received data symbol on the $i^{th}$ antenna, diag($h_i'$) is a diagonal matrix, a diagonal elements of which is the channel estimation value $h_i'$, $1 \leq i \leq N$, N is the number of antennas, W is noise, $\sigma^2$ is noise power spectral density, β is a constant associated with digital modulation, I is an identity matrix, $A^H$ represents a conjugate transpose of matrix A, and $B^H$ represents a conjugate transpose of matrix B.

The equalization estimation unit is further configured to, in the case of multiple users and multiple antennas, acquire the estimation value of the transmitted symbol x based on $$\begin{cases} y_1 = M(f_1)\text{diag}(h'_{1,1})x_1 + M(f_2)\text{diag}(h'_{1,2})x_2 + \\ \quad \ldots + M(f_M)\text{diag}(h'_{1,M})x_M + n_1 \\ y_2 = M(f_1)\text{diag}(h'_{2,1})x_1 + M(f_2)\text{diag}(h'_{2,2})x_2 + \\ \quad \ldots + M(f_M)\text{diag}(h'_{2,M})x_M + n_2 \\ \quad \vdots \\ y_N = M(f_1)\text{diag}(h'_{N,1})x_1 + M(f_2)\text{diag}(h'_{N,2})x_2 + \\ \quad \ldots + M(f_M)\text{diag}(h'_{N,M})x_M + n_N \end{cases}$$

as follows:

$$\hat{x} = (\sigma^2 \beta I + A^H A)^{-1} * A^H y; \text{ or}$$

$$\hat{x} = (A^H A)^{-1} * A^H y; \text{ or}$$

$$\hat{x} = (\sigma^2 \beta I + B^H B)^{-1} * B^H * M(-f) * y; \text{ or}$$

$$\hat{x} = (B^H B)^{-1} * B^H * M(-f) * y; \text{ where}$$

$$y = \begin{bmatrix} y_1 \\ y_2 \\ \vdots \\ y_N \end{bmatrix},$$

$$A = \begin{bmatrix} M(f_1)\text{diag}(h'_{1,1}) & M(f_2)\text{diag}(h'_{1,2}) & \cdots & M(f_M)\text{diag}(h'_{1,M}) \\ M(f_1)\text{diag}(h'_{2,1}) & M(f_2)\text{diag}(h'_{2,2}) & \cdots & M(f_M)\text{diag}(h'_{2,M}) \\ \vdots & \vdots & & \vdots \\ M(f_1)\text{diag}(h'_{N,1}) & M(f_2)\text{diag}(h'_{N,2}) & \cdots & M(f_M)\text{diag}(h'_{N,M}) \end{bmatrix},$$

$$M(f) = \begin{bmatrix} M(f_1) \\ M(f_2) \\ \vdots \\ M(f_M) \end{bmatrix}, B = \begin{bmatrix} \text{diag}(h'_{1,1}) & \text{diag}(h'_{1,2}) & \cdots & \text{diag}(h'_{1,M}) \\ \text{diag}(h'_{2,1}) & \text{diag}(h'_{2,2}) & \cdots & \text{diag}(h'_{2,M}) \\ \vdots & \vdots & & \vdots \\ \text{diag}(h'_{N,1}) & \text{diag}(h'_{N,2}) & \cdots & \text{diag}(h'_{N,M}) \end{bmatrix},$$

$y_i$ is a received data symbol on the $i^{th}$ antenna, $h_{i,j}'$ is a channel estimation value corresponding to the received data symbol on the $i^{th}$ antenna, $\text{diag}(h_{i,j}')$ is a diagonal matrix, a diagonal element of which is the channel estimation value, $h_{i,j}'$, $n_i$ is noise, M is the number of users, N is the number of antennas, M<N, $1 \leq i \leq N$, $\sigma^2$ is noise power spectral density, $\beta$ is a constant associated with digital modulation, I is an identity matrix, $A^H$ represents a conjugate transpose of matrix A, and $B^H$ represents a conjugate transpose of matrix B.

The method for frequency offset compensation and equalization in accordance with the present invention introduces the matrix M(f) upon estimation, thereby restraining interference between sub-carriers caused by large frequency offset and improving reception performance.

INDUSTRIAL APPLICABILITY

The present invention allows a receiver in a communication system to compensate for frequency offset more accurately when signal frequency offset is relatively large so as to restrain interference between sub-carriers and improve performance of the receiver in the case of large frequency offset.

What is claimed is:

1. A method for frequency offset compensation and equalization in an orthogonal frequency division multiplexing system comprising:
   acquiring a channel estimation value h and a frequency offset value f at a reference symbol;
   acquiring a Toeplitz matrix M(f) based on the frequency offset value f;
   performing phase compensation on the channel estimation value h to obtain a channel estimation value h' at a data symbol; and
   acquiring an estimation value of a transmitted symbol x based on M(f) and h';
   wherein $M(f)=(a_{k,l})$, $$a_{k,l} = \begin{cases} \left\{\dfrac{\sin(\pi\gamma)}{N\sin\left(\frac{\pi\gamma}{N}\right)}\right\}\exp\left(j\pi\gamma\dfrac{N-1}{N}\right), \text{ when } k = l \\ \left\{\dfrac{\sin(\pi\gamma)}{N\sin\left(\frac{\pi(l-k+\gamma)}{N}\right)}\right\}\exp\left(-j\pi\dfrac{l-k}{N}\right)\exp\left(j\pi\gamma\dfrac{N-1}{N}\right), \text{ when } k \neq l \end{cases}$$

or
when $|k-l|>C$, $a_{k,l}=0$, C is a predetermined constant, and when $|k-l|\leq C$, $$a_{k,l} = \begin{cases} \left\{\dfrac{\sin(\pi\gamma)}{N\sin\left(\frac{\pi\gamma}{N}\right)}\right\}\exp\left(j\pi\gamma\dfrac{N-1}{N}\right), \text{ when } k = l \\ \left\{\dfrac{\sin(\pi\gamma)}{N\sin\left(\frac{\pi(l-k+\gamma)}{N}\right)}\right\}\exp\left(-j\pi\dfrac{l-k}{N}\right)\exp\left(j\pi\gamma\dfrac{N-1}{N}\right), \text{ when } k \neq l \end{cases}$$

k and l are sub-carrier identifiers, a value range of which is 0 to m−1, m is the number of sub-carriers used by frequency offset estimation, $$\gamma = \frac{f}{F},$$

F is an interval between the sub-carriers, N is the number of Fast Fourier Transform (FFT) points of one Orthogonal Frequency Division Multiplexing (OFDM) symbol.

2. The method according to claim 1, wherein
   h'=h·exp(j2πf Δt), and Δt is a directed time difference between the data symbol and reference symbol.

3. The method according to claim 1, wherein
   in the case of a singleuser and a singleantenna, the step of acquiring the estimation value of the transmitted symbol x based on M(f) and h' comprises:
   acquiring the estimation value of the transmitted symbol x based on M(f)diag(h')x+n=y as follows:

$$\hat{x}=(\sigma^2\beta I+A^H A)^{-1}*A^H y;$$

$$\text{or } \hat{x}=(A^H A)^{-1}*A^H y;$$

$$\text{or } \hat{x}=(\sigma^2\beta I+B^H B)^{-1}*B^H*M(-f)*y;$$

$$\text{or } \hat{x}=(B^H B)^{-1}*B^H*M(-f)*y;$$

where diag(h') is a diagonal matrix, a diagonal element of which is the channel estimation value h', y is a received data symbol, n is noise, A=M(f)diag(h'), $A^H$ represents a conjugatetranspose of matrix A, $\sigma^2$ is noise power spectral density, $\beta$ is a constant associated with digital modulation, and I is an identity matrix, B=diag(h'), and $B^H$ represents a conjugate transpose of matrix B.

4. The method according to claim 1, wherein
in the case of a single user and multiple antennas, the step of acquiring the estimation value of the transmitted symbol x based on M(f) and h' comprises:
acquiring the estimation value of the transmitted symbol x based on $$\begin{bmatrix} M(f)\text{diag}(h'_1) \\ M(f)\text{diag}(h'_2) \\ \vdots \\ M(f)\text{diag}(h'_N) \end{bmatrix} x + W = \begin{bmatrix} y_1 \\ y_2 \\ \vdots \\ y_N \end{bmatrix}$$

as follows:

$$\hat{x} = (\sigma^2 \beta I + A^H A)^{-1} * A^H y; \text{ or}$$

$$\hat{x} = (A^H A)^{-1} * A^H y; \text{ or}$$

$$\hat{x} = (\sigma^2 \beta I + B^H B)^{-1} * B^H * M(-f) * y; \text{ or}$$

$$\hat{x} = (B^H B)^{-1} * B^H * M(-f) * y; \text{ where}$$

$$y = \begin{bmatrix} y_1 \\ y_2 \\ \vdots \\ y_N \end{bmatrix}, A = \begin{bmatrix} M(f)\text{diag}(h'_1) \\ M(f)\text{diag}(h'_2) \\ \vdots \\ M(f)\text{diag}(h'_N) \end{bmatrix}, B = \begin{bmatrix} \text{diag}(h'_1) \\ \text{diag}(h'_2) \\ \vdots \\ \text{diag}(h'_N) \end{bmatrix},$$

$y_i$ is a received data symbol on the $i^{th}$ antenna, $h_i'$ is a channel estimation value corresponding to the received data symbol on the $i^{th}$ antenna, $\text{diag}(h_i')$ is a diagonal matrix, a diagonal elements of which is the channel estimation value $h_i'$, $1 \leq i \leq N$, N is the number of antennas, W is noise, $\sigma^2$ is noise power spectral density, $\beta$ is a constant associated with digital modulation, I is an identity matrix, $A^H$ represents a conjugate transpose of matrix A, and $B^H$ represents a conjugate transpose of matrix B.

5. The method according to claim 1, wherein
in the case of multiple users and multiple antennas, the step of acquiring the estimation value of the transmitted symbol x based on M(f) and h' comprises:
acquiring the estimation value of the transmitted symbol x based on $$\begin{cases} y_1 = M(f_1)\text{diag}(h'_{1,1})x_1 + M(f_2)\text{diag}(h'_{1,2})x_2 + \\ \quad \ldots + M(f_M)\text{diag}(h'_{1,M})x_M + n_1 \\ y_2 = M(f_1)\text{diag}(h'_{2,1})x_1 + M(f_2)\text{diag}(h'_{2,2})x_2 + \\ \quad \ldots + M(f_M)\text{diag}(h'_{2,M})x_M + n_2 \\ \quad \vdots \\ y_N = M(f_1)\text{diag}(h'_{N,1})x_1 + M(f_2)\text{diag}(h'_{N,2})x_2 + \\ \quad \ldots + M(f_M)\text{diag}(h'_{N,M})x_M + n_N \end{cases}$$

as follows:

$$\hat{x} = (\sigma^2 \beta I + A^H A)^{-1} * A^H y; \text{ or}$$

$$\hat{x} = (A^H A)^{-1} * A^H y; \text{ or}$$

$$\hat{x} = (\sigma^2 \beta I + B^H B)^{-1} * B^H * M(-f) * y; \text{ or}$$

$$\hat{x} = (B^H B)^{-1} * B^H * M(-f) * y; \text{ where}$$

$$y = \begin{bmatrix} y_1 \\ y_2 \\ \vdots \\ y_N \end{bmatrix},$$

$$A = \begin{bmatrix} M(f_1)\text{diag}(h'_{1,1}) & M(f_2)\text{diag}(h'_{1,2}) & \cdots & M(f_M)\text{diag}(h'_{1,M}) \\ M(f_1)\text{diag}(h'_{2,1}) & M(f_2)\text{diag}(h'_{2,2}) & \cdots & M(f_M)\text{diag}(h'_{2,M}) \\ \vdots & \vdots & & \vdots \\ M(f_1)\text{diag}(h'_{N,1}) & M(f_2)\text{diag}(h'_{N,2}) & \cdots & M(f_M)\text{diag}(h'_{N,M}) \end{bmatrix},$$

$$M(f) = \begin{bmatrix} M(f_1) \\ M(f_2) \\ \vdots \\ M(f_M) \end{bmatrix}, B = \begin{bmatrix} \text{diag}(h'_{1,1}) & \text{diag}(h'_{1,2}) & \cdots & \text{diag}(h'_{1,M}) \\ \text{diag}(h'_{2,1}) & \text{diag}(h'_{2,2}) & \cdots & \text{diag}(h'_{2,M}) \\ \vdots & \vdots & & \vdots \\ \text{diag}(h'_{N,1}) & \text{diag}(h'_{N,2}) & \cdots & \text{diag}(h'_{N,M}) \end{bmatrix},$$

$y_i$ is a received data symbol on the $i^{th}$ antenna, $h_{i,j}'$ is a channel estimation value corresponding to the received data symbol on the $i^{th}$ antenna, $\text{diag}(h_{i,j}')$ is a diagonal matrix, a diagonal element of which is the channel estimation value $h_{i,j}'$, $n_i$ is noise, M is the number of users, N is the number of antennas, M<N, $1 \leq i \leq N$, $\sigma^2$ is noise power spectral density, $\beta$ is a constant associated with digital modulation, I is an identity matrix, $A^H$ represents a conjugate transpose of matrix A, and $B^H$ represents a conjugate transpose of matrix B.

6. A device for frequency offset compensation and equalization in an orthogonal frequency division multiplexing system comprising:
a channel estimation unit configured to acquire a channel estimation value h and a frequency offset value f at a reference symbol;
a frequency offset acquisition unit configured to acquire a Toeplitz matrix M(f) based on the frequency offset value f;
a channel compensation unit configured to perform phase compensation on the channel estimation value h to obtain a channel estimation value h' at a data symbol; and
an equalization estimation unit configured to acquire an estimation value of a transmitted symbol x based on M(f) and h'
wherein $$M(f) = (a_{k,l}),$$

$$a_{k,l} = \begin{cases} \left\{ \dfrac{\sin(\pi\gamma)}{N \sin\left(\dfrac{\pi\gamma}{N}\right)} \right\} \exp\left(j\pi\gamma \dfrac{N-1}{N}\right), \text{ when } k = l \\ \left\{ \dfrac{\sin(\pi\gamma)}{N \sin\left(\dfrac{\pi(l-k+\gamma)}{N}\right)} \right\} \exp\left(-j\pi \dfrac{l-k}{N}\right) \exp\left(j\pi\gamma \dfrac{N-1}{N}\right), \\ \qquad\qquad\qquad \text{when } k \neq l \end{cases}$$

or
when $|k-l|>C$, $a_{k,l}=0$, C is a predetermined constant, and when $|k-l| \leq C$, $$a_{k,l} = \begin{cases} \left\{\dfrac{\sin(\pi\gamma)}{N\sin\left(\dfrac{\pi\gamma}{N}\right)}\right\}\exp\left(j\pi\gamma\dfrac{N-1}{N}\right), \text{ when } k = l \\ \left\{\dfrac{\sin(\pi\gamma)}{N\sin\left(\dfrac{\pi(l-k+\gamma)}{N}\right)}\right\}\exp\left(-j\pi\dfrac{l-k}{N}\right)\exp\left(j\pi\gamma\dfrac{N-1}{N}\right), \text{ when } k \neq l \end{cases}$$

k and l are sub-carrier identifiers, a value range of which is 0 to m−1, m is the number of sub-carriers used by frequency offset estimation, $$\gamma = \frac{f}{F},$$

F is an interval between the sub-carriers N is the number of Fast Fourier Transform (FFT) points of one Orthogonal Frequency Division Multiplexing (OFDM) symbol.

7. The device according to claim 6, wherein h'=h·exp(j2πf Δt), and Δt is a directed time difference between the data symbol and reference symbol.

8. The device according to claim 6, wherein theequalization estimation unit is further configured to, in the case of a singleuser and a singleantenna, acquire the estimation value of the transmitted symbol x based on M(f)diag(h')x+n=y as follows:

$\hat{x}=(\sigma^2\beta I+A^H A)^{-1}*A^H y;$ or $\hat{x}=(A^H A)^{-1}*A^H y;$ or $\hat{x}=(\sigma^2\beta I+B^H B)^{-1}*B^H*M(-f)*y;$ or $\hat{x}=(B^H B)^{-1}*B^H*M(-f)*y;$ where diag(h') is a diagonal matrix, a diagonal element of which is the channel estimation value h', y is a received data symbol, n is noise, A=M(f)diag(h'), $A^H$ represents a conjugatetranspose of matrix A, $\sigma^2$ is noise power spectral density, β is a constant associated with digital modulation, and I is an identity matrix, B=diag(h'), and $B^H$ represents a conjugate transpose of matrix B.

9. The device according to claim 6, wherein theequalization estimation unit is further configured to, in the case of a singleuser and multipleantennas, acquire the estimation value of the transmitted symbol x based on $$\begin{bmatrix} M(f)\text{diag}(h'_1) \\ M(f)\text{diag}(h'_2) \\ \vdots \\ M(f)\text{diag}(h'_N) \end{bmatrix} x + W = \begin{bmatrix} y_1 \\ y_2 \\ \vdots \\ y_N \end{bmatrix}$$

as follows:

$\hat{x} = (\sigma^2\beta I + A^H A)^{-1} * A^H y;$ or $\hat{x} = (A^H A)^{-1} * A^H y;$ or $\hat{x} = (\sigma^2\beta I + B^H B)^{-1} * B^H * M(-f) * y;$ or $\hat{x} = (B^H B)^{-1} * B^H * M(-f) * y;$ where -continued $$y = \begin{bmatrix} y_1 \\ y_2 \\ \vdots \\ y_N \end{bmatrix}, A = \begin{bmatrix} M(f)\text{diag}(h'_1) \\ M(f)\text{diag}(h'_2) \\ \vdots \\ M(f)\text{diag}(h'_N) \end{bmatrix}, B = \begin{bmatrix} \text{diag}(h'_1) \\ \text{diag}(h'_2) \\ \vdots \\ \text{diag}(h'_N) \end{bmatrix},$$

$y_i$ is a received data symbol on the $i^{th}$ antenna, $h_i'$ is a channel estimation value corresponding to the received data symbol on the $i^{th}$ antenna, diag($h_i'$) is a diagonal matrix, a diagonal elements of which is the channel estimation value $h_i'$, $1 \leq i \leq N$, N is the number of antennas, W is noise, $\sigma^2$ is noise power spectral density, β is a constant associated with digital modulation, I is an identity matrix, $A^H$ represents a conjugate transpose of matrix A, and $B^H$ represents a conjugate transpose of matrix B.

10. The device according to claim 6, wherein theequalization estimation unit is further configured to, in the case of multipleusers and multipleantennas, acquire the estimation value of the transmitted symbol x based on $$\begin{cases} y_1 = M(f_1)\text{diag}(h'_{1,1})x_1 + M(f_2)\text{diag}(h'_{1,2})x_2 + \ldots + \\ \qquad M(f_M)\text{diag}(h'_{1,M})x_M + n_1 \\ y_2 = M(f_1)\text{diag}(h'_{2,1})x_1 + M(f_2)\text{diag}(h'_{2,2})x_2 + \ldots + \\ \qquad M(f_M)\text{diag}(h'_{2,M})x_M + n_2 \\ \qquad \vdots \\ y_N = M(f_1)\text{diag}(h'_{N,1})x_1 + M(f_2)\text{diag}(h'_{N,2})x_2 + \ldots + \\ \qquad M(f_M)\text{diag}(h'_{N,M})x_M + n_N \end{cases}$$

as follows:

$\hat{x} = (\sigma^2\beta I + A^H A)^{-1} * A^H y;$ or $\hat{x} = (A^H A)^{-1} * A^H y;$ or $\hat{x} = (\sigma^2\beta I + B^H B)^{-1} * B^H * M(-f) * y;$ or $\hat{x} = (B^H B)^{-1} * B^H * M(-f) * y;$ where $$y = \begin{bmatrix} y_1 \\ y_1 \\ \vdots \\ y_N \end{bmatrix},$$

$$A = \begin{bmatrix} M(f_1)\text{diag}(h'_{1,1}) & M(f_2)\text{diag}(h'_{1,2}) & \ldots & M(f_M)\text{diag}(h'_{1,M}) \\ M(f_1)\text{diag}(h'_{2,1}) & M(f_2)\text{diag}(h'_{2,2}) & \ldots & M(f_M)\text{diag}(h'_{2,M}) \\ \vdots & \vdots & & \vdots \\ M(f_1)\text{diag}(h'_{N,1}) & M(f_2)\text{diag}(h'_{N,2}) & \ldots & M(f_M)\text{diag}(h'_{N,M}) \end{bmatrix},$$

$$M(f) = \begin{bmatrix} M(f_1) \\ M(f_2) \\ \vdots \\ M(f_M) \end{bmatrix}, B = \begin{bmatrix} \text{diag}(h'_{1,1}) & \text{diag}(h'_{1,2}) & \ldots & \text{diag}(h'_{1,M}) \\ \text{diag}(h'_{2,1}) & \text{diag}(h'_{2,2}) & \ldots & \text{diag}(h'_{2,M}) \\ \vdots & \vdots & & \vdots \\ \text{diag}(h'_{N,1}) & \text{diag}(h'_{N,2}) & \ldots & \text{diag}(h'_{N,M}) \end{bmatrix},$$

$y_i$ is a received data symbol on the $i^{th}$ antenna, $h_{i,j}'$ is a channel estimation value corresponding to the received data symbol on the $i^{th}$ antenna, diag($h_{i,j}'$) is a diagonal matrix, a diagonal element of which is the channel estimation value $h_{i,j}'$, $n_i$ is noise, M is the number of users, N is the number of antennas, M<N, $1 \leq i \leq N$, $\sigma^2$ is noise power spectral density, β is a constant associated with digital modulation, I is an identity matrix, A' represents a conjugate transpose of matrix A, and $B^H$ represents a conjugate transpose of matrix B.

11. The method according to claim 2, wherein
In the case of a singleuser and a singleantenna, the step of acquiring the estimation value of the transmitted symbol x based on M(f) and h' comprises:
acquiring the estimation value of the transmitted symbol x based on M(f)diag(h')x+n=y as follows:

$\hat{x}=(\sigma^2\beta I+A^HA)^{-1}*A^Hy;$ or $\hat{x}=(A^HA)^{-1}*A^Hy;$ or $\hat{x}=(\sigma^2\beta I+B^HB)^{-1}*B^H*M(-f)*y;$ or $\hat{x}=(B^HB)^{-1}*B^H*M(-f)*y;$ where diag(h') is a diagonal matrix, a diagonal element of which is the channel estimation value h', y is a received data symbol, n is noise, A=M(f)diag $A^H$ represents a conjugatetranspose of matrix A, $\sigma^{-2}$ is noise power spectral density, β is a constant associated with digital modulation, and I is an identity matrix, B=diag(h'), and $B^H$ represents a conjugate transpose of matrix B.

12. The method according to claim 2, wherein
in the case of a singleuser and multipleantennas, the step of acquiring the estimation value of the transmitted symbol x based on M(f) and h' comprises:
acquiring the estimation value of the transmitted symbol x based on $$\begin{bmatrix} M(f)\text{diag}(h'_1) \\ M(f)\text{diag}(h'_2) \\ \vdots \\ M(f)\text{diag}(h'_N) \end{bmatrix} x + W = \begin{bmatrix} y_1 \\ y_2 \\ \vdots \\ y_N \end{bmatrix}$$

as follows:

$\hat{x} = (\sigma^2\beta I + A^HA)^{-1} * A^Hy;$ or $\hat{x} = (A^HA)^{-1} * A^Hy;$ or $\hat{x} = (\sigma^2\beta I + B^HB)^{-1} * B^H * M(-f) * y;$ or $\hat{x} = (B^HB)^{-1} * B^H * M(-f) * y;$ where $$y = \begin{bmatrix} y_1 \\ y_2 \\ \vdots \\ y_N \end{bmatrix}, A = \begin{bmatrix} M(f)\text{diag}(h'_1) \\ M(f)\text{diag}(h'_2) \\ \vdots \\ M(f)\text{diag}(h'_N) \end{bmatrix}, B = \begin{bmatrix} \text{diag}(h'_1) \\ \text{diag}(h'_2) \\ \vdots \\ \text{diag}(h'_N) \end{bmatrix},$$

$y_i$ is a received data symbol on the $i^{th}$ antenna, $h_i'$ is a channel estimation value corresponding to the received data symbol on the $i^{th}$ antenna, diag($h_i'$) is a diagonal matrix, a diagonal elements of which is the channel estimation value $h_i'$, $1 \leq i \leq N$, N is the number of antennas, W is noise, $\sigma^2$ is noise power spectral density, β is a constant associated with digital modulation, I is an identity matrix, $A^H$ represents a conjugate transpose of matrix A, and $B^H$ represents a conjugate transpose of matrix B.

13. The method according to claim 2, wherein
in the case of multipleusers and multipleantennas, the step of acquiring the estimation value of the transmitted symbol x based on M(f) and h' comprises:
acquiring the estimation value of the transmitted symbol x based on $$\begin{cases} y_1 = M(f_1)\text{diag}(h'_{1,1})x_1 + M(f_2)\text{diag}(h'_{1,2})x_2 + \ldots + \\ \qquad M(f_M)\text{diag}(h'_{1,M})x_M + n_1 \\ y_2 = M(f_1)\text{diag}(h'_{2,1})x_1 + M(f_2)\text{diag}(h'_{2,2})x_2 + \ldots + \\ \qquad M(f_M)\text{diag}(h'_{2,M})x_M + n_2 \\ \qquad \vdots \\ y_N = M(f_1)\text{diag}(h'_{N,1})x_1 + M(f_2)\text{diag}(h'_{N,2})x_2 + \ldots + \\ \qquad M(f_M)\text{diag}(h'_{N,M})x_M + n_N \end{cases}$$

as follows:

$\hat{x} = (\sigma^2\beta I + A^HA)^{-1} * A^Hy;$ or $\hat{x} = (A^HA)^{-1} * A^Hy;$ or $\hat{x} = (\sigma^2\beta I + B^HB)^{-1} * B^H * M(-f) * y;$ or $\hat{x} = (B^HB)^{-1} * B^H * M(-f) * y;$ where $$y = \begin{bmatrix} y_1 \\ y_1 \\ \vdots \\ y_N \end{bmatrix},$$

$$A = \begin{bmatrix} M(f_1)\text{diag}(h'_{1,1}) & M(f_2)\text{diag}(h'_{1,2}) & \ldots & M(f_M)\text{diag}(h'_{1,M}) \\ M(f_1)\text{diag}(h'_{2,1}) & M(f_2)\text{diag}(h'_{2,2}) & \ldots & M(f_M)\text{diag}(h'_{2,M}) \\ \vdots & \vdots & & \vdots \\ M(f_1)\text{diag}(h'_{N,1}) & M(f_2)\text{diag}(h'_{N,2}) & \ldots & M(f_M)\text{diag}(h'_{N,M}) \end{bmatrix},$$

$$M(f) = \begin{bmatrix} M(f_1) \\ M(f_2) \\ \vdots \\ M(f_M) \end{bmatrix}, B = \begin{bmatrix} \text{diag}(h'_{1,1}) & \text{diag}(h'_{1,2}) & \ldots & \text{diag}(h'_{1,M}) \\ \text{diag}(h'_{2,1}) & \text{diag}(h'_{2,2}) & \ldots & \text{diag}(h'_{2,M}) \\ \vdots & \vdots & & \vdots \\ \text{diag}(h'_{N,1}) & \text{diag}(h'_{N,2}) & \ldots & \text{diag}(h'_{N,M}) \end{bmatrix},$$

$y_i$ is a received data symbol on the $i^{th}$ antenna, $h_{i,j}'$ is a channel estimation value corresponding to the received data symbol on the $i^{th}$ antenna, diag($h_{i,j}'$) is a diagonal matrix, a diagonal element of which is the channel estimation value $h_{i,j}'$, $n_i$ is noise, M is the number of users, N is the number of antennas, M<N, $1 \leq i \leq N$, $\sigma^2$ is noise power spectral density, β is a constant associated with digital modulation, I is an identity matrix, $A^H$ represents a conjugate transpose of matrix A, and $B^H$ represents a conjugate transpose of matrix B.

\* \* \* \* \*

UNITED STATES PATENT AND TRADEMARK OFFICE
CERTIFICATE OF CORRECTION

| | | |
|---|---|---|
| PATENT NO. | : 8,897,121 B2 | Page 1 of 3 |
| APPLICATION NO. | : 13/576814 | |
| DATED | : November 25, 2014 | |
| INVENTOR(S) | : Xiao | |

It is certified that error appears in the above-identified patent and that said Letters Patent is hereby corrected as shown below:

In the claims

Column 14, Line 48, Claim 3:

After "in the case of a"
Delete "singleuser and multipleantennas" and
Insert -- single user and multiple antennas --.

Column 14, Lines 63-64, Claim 3:

After "represents a"
Delete "conjugatetranspose" and
Insert -- conjugate transpose --.

Column 15, Line 2, Claim 4:

After "in the case of a"
Delete "singleuser and multipleantennas" and
Insert -- single user and multiple antennas --.

Column 17, Line 25, Claim 8:

Delete "theequalization" and
Insert -- the equalization --.

Signed and Sealed this
Fifth Day of July, 2016

Michelle K. Lee
*Director of the United States Patent and Trademark Office*

In the claims

Column 17, Line 26, Claim 8:

After "in the case of a"
Delete -- singleuser and a singleantenna" and
Insert -- single user and a single antenna --.

Column 17, Line 41, Claim 8

Delete "conjugatetranspose" and
Insert -- conjugate transpose --

Column 17, Line 46, Claim 9:

After "according to claim 7, wherein"
Delete "theequalization" and
Insert -- the equalization --.

Column 17, Line 47, Claim 9:

After "in the case of a"
Delete "singleuser and multipleantennas" and
Insert -- single user and multiple antennas --.

Column 18, Line 19, Claim 10:

Delete "theequalization" and
Insert -- the equalization --.

Column 18, Line 20, Claim 10:

After "in the case of a"
Delete "singleuser and multipleantennas" and
Insert -- single user and multiple antennas --.

Column 19, Line 5, Claim 11:

After "in the case of a"
Delete "singleuser and multipleantennas" and
Insert -- single user and multiple antennas --.

CERTIFICATE OF CORRECTION (continued)
U.S. Pat. No. 8,897,121 B2

In the claims

Column 19, Line 25, Claim 12:

After "in the case of a"
Delete "singleuser and multipleantennas" and
Insert -- single user and multiple antennas --.

Column 20, Line 6, Claim 13:

After "in the case of a"
Delete "multipleusers and multipleantennas" and
Insert -- multiple user and multiple antennas --.